April 8, 1958     A. MAGNANI     2,829,909

PACKED SLEEVE-TYPE COUPLING WITH MULTIPLE SEALS

Filed Sept. 15, 1954

United States Patent Office 2,829,909
Patented Apr. 8, 1958

2,829,909

PACKED SLEEVE-TYPE COUPLING WITH MULTIPLE SEALS

Alessandro Magnani, Broni, Italy

Application September 15, 1954, Serial No. 456,236

Claims priority, application Italy May 5, 1954

2 Claims. (Cl. 285—95)

Pipe joints comprising a resilient packing fitted to each end of the contiguous pipe sections to be coupled and pressed on said ends by a sleeve are known.

This type of joint does not insure an accurate axial alignment of the pipes to be coupled; moreover, the sealing packings are directly in contact with external agents and the fluid conveyed by the piping.

The latter drawback may be found more particularly serious when the piping conveys gases containing rubber aggressive substances.

It is the object of this invention to eliminate the above-mentioned drawbacks without impairing the resiliency of the joint.

I provide for this purpose ahead and/or past the sealing packing one or more auxiliary packings of a shape such to promote centering of the sleeve in cooperation with the main packing and of properties such as to safely withstand the action of agents both inside and outside the piping.

Figure 1:
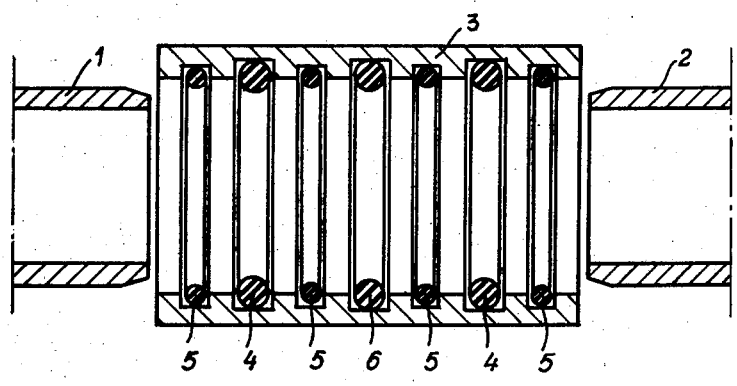
Figure 2:
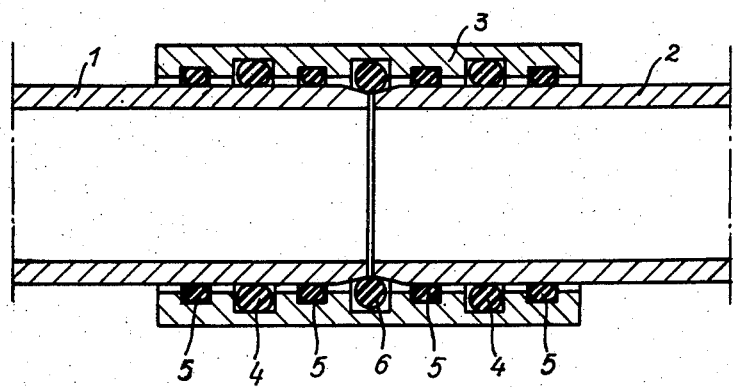

On the accompanying drawings, Figure 1 shows a joint ready for assembly, Figure 2 shows the assembled joint.

In figures, 1 and 2 denotes the ends of the pipes to be coupled, 3 the connecting sleeve formed with grooves receiving the main packings 4, auxiliary packings 5 and resilient abutment 6. All the packings consist of O-rings, the ring 4 being of greater cross-section than the auxiliary rings 5.

Assembly is effected by forcing the ends of the pipes to be coupled into the sleeve against the abutment 6. The packings are of such size as to be sufficiently compressed by effect of the insertion of both pipes into the sleeve.

It is obvious that the set of packings will afford an accurate co-axial alignment of the pipes.

It may actually be sufficient to provide one auxiliary packing at the end of one pipe only, besides the main packings.

Tightness of seal is afforded chiefly by the main packings 4, the auxiliary packings 5 serving more particularly to avoid direct contact of the packings 4 with external and internal agents.

The auxiliary packings may, if desired, be insufficiently resilient for a tight-seal; their protective action is nevertheless maintained, in that they avoid renewal of the fluid enclosed between these packings and the main packings.

It will be understood that the pipe joint may be carried out in other manners within the scope of this invention.

What I claim is:

1. In a pipe connection, the combination with two pipes of equal outer diameter, an outer sleeve-like member having an inner diameter greater than the outer diameter of each of said pipes, a set of equal main packings and a set of equal auxiliary packings each having the form of an O-ring of resilient material, the diameter of the cross section of said main packings being greater than that of said auxiliary packings, the inner diameter of each of said packings being smaller than the outer diameter of said pipes to be connected, a set of at least three U-shaped deeper annular grooves cut in the inner periphery of said sleeve-like member for receiving said main packings, said grooves being parallel and axially spaced therebetween, a set of U-shaped shallower annular grooves cut in the inner periphery of said sleeve-like member on both sides of each of said deeper grooves, for receiving said auxiliary packings, a central one of said deeper grooves being centrally located with its cross plane of symmetry coinciding with the middle cross plane of said sleeve-like member, said packings having a greater initial radial thickness than the distance between the radially outer wall of the grooves and the radially opposite portion of the outer circumference of said pipes, whereby upon assembly of the connection the main packing arranged in said central deeper groove is engaged by the ends of the pipes to be connected and constitutes a resilient spacing member between the ends of said pipes, and said other packings form a seal between said sleeve-like member and said pipes.

2. In a pipe connection, the combination with two pipes of equal outer diameter and externally bevelled end portions, an outer sleeve-like member having an inner diameter greater than the outer diameter of each of said pipes, a set of equal main packings and a set of equal auxiliary packings each having the form of an O-ring of resilient material, the diameter of the cross section of said main packings being greater than that of said auxiliary packings, the inner diameter of each of said packings being smaller than the outer diameter of said pipes to be connected, a set of at least three U-shaped deeper annular grooves cut in the inner periphery of said sleeve-like member for receiving said main packings, said grooves being parallel and axially spaced therebetween, a set of U-shaped shallower annular grooves cut in the inner periphery of said sleeve-like member on both sides of each of said deeper grooves, for receiving said auxiliary packings, a central one of said deeper grooves being centrally located with its cross plane of symmetry coinciding with the middle cross plane of said sleeve-like member, said packings having a greater initial radial thickness than the distance between the radially outer wall of the grooves and the radially opposite portion of the outer circumference of said pipes, whereby upon assembly of the connection the main packing arranged in said central deeper groove abuts by the parts of its opposed flanks near its inner diameter the bevelled end portions of the pipes to be connected and forms a resilient spacing member between the end portions of said pipes, and said other packings form a seal between said sleeve-like member and said pipes.

References Cited in the file of this patent

UNITED STATES PATENTS

| | | |
|---|---|---|
| 2,105,747 | Martin | Jan. 18, 1938 |
| 2,438,529 | Woodling | Mar. 30, 1948 |
| 2,597,482 | Harrison et al. | May 20, 1952 |
| 2,738,992 | Heisler | Mar. 20, 1956 |
| 2,772,100 | Kressig | Nov. 27, 1956 |

FOREIGN PATENTS

| | | |
|---|---|---|
| 405,717 | Great Britain | Feb. 15, 1934 |
| 525,153 | Great Britain | Aug. 22, 1940 |
| 626,968 | Great Britain | July 25, 1949 |
| 663,255 | Great Britain | Dec. 19, 1951 |